(12) United States Patent
Clausen et al.

(10) Patent No.: US 7,735,199 B2
(45) Date of Patent: Jun. 15, 2010

(54) AIRCRAFT DOOR HINGE ASSEMBLY

(75) Inventors: Charles Clausen, La Conner, WA (US); Jeff Feathers, Seattle, WA (US); Andrew Keleher, Marysville, WA (US)

(73) Assignee: B/E Aerospace, Inc., Wellington, FL (US)

(*) Notice: Subject to any disclaimer, the term of this patent is extended or adjusted under 35 U.S.C. 154(b) by 0 days.

(21) Appl. No.: 12/118,089

(22) Filed: May 9, 2008

(65) Prior Publication Data

US 2008/0276428 A1 Nov. 13, 2008

Related U.S. Application Data

(60) Provisional application No. 60/928,381, filed on May 9, 2007.

(51) Int. Cl.
*E05D 7/00* (2006.01)
(52) U.S. Cl. ............... 16/354; 224/129.4; 224/129.5
(58) Field of Classification Search ........... 244/129.5, 244/129.4; 16/362, 366, 370, 354; 49/209, 49/212, 216, 221, 223, 254
See application file for complete search history.

(56) References Cited

U.S. PATENT DOCUMENTS

| | | | | |
|---|---|---|---|---|
| 5,289,615 A | * | 3/1994 | Banks et al. | 16/366 |
| 6,183,039 B1 | * | 2/2001 | Kohut et al. | 296/155 |
| 2005/0178601 A1 | * | 8/2005 | Galvani et al. | 180/271 |

* cited by examiner

*Primary Examiner*—Victor Batson
*Assistant Examiner*—Emily M Morgan
(74) *Attorney, Agent, or Firm*—Drinker Biddle & Reath LLP

(57) ABSTRACT

A hinge assembly for use with a door, in particular, an aircraft door, that enables the door to remain substantially parallel to the fuselage of the aircraft when the door is open and closed. The hinge assembly includes a door support assembly that couples to the door, and a hinge arm assembly. The hinge arm assembly includes a first gear assembly that couples to the fuselage, a second gear assembly that couples the hinge arm assembly to the door support assembly, and a linkage assembly coupled to the first and second gear assemblies. The first and second gear assemblies and linkage assembly cooperate to move the door support assembly and hinge arm assembly with respect to each other.

14 Claims, 15 Drawing Sheets

AIRCRAFT DOOR HINGE ASSEMBLY

CROSS-REFERENCE TO RELATED PATENT APPLICATIONS

This application claims benefit from U.S. Provisional Patent Application No. 60/928,381, filed on May 9, 2007, the entire contents of which being incorporated herein by reference.

FIELD OF THE INVENTION

The present invention relates to a hinge assembly adapted for use with a door. More particularly, the present invention relates to a hinge assembly for an aircraft door that enables the door to be substantially parallel to the fuselage of the aircraft when the door is in the open and closed positions.

BACKGROUND

Many different types of aircraft door assemblies exist. For example, in recreational or propeller aircraft, the door assemblies can be configured to open by swinging out in a manner similar to a car door or door of a dwelling. However, in commercial aircraft having pressurized cabins, door assemblies are more complicated to allow for pressurization, and are configured to open and close in a manner that does not obstruct or interfere with the jetway so that passengers can easily enter and exit the aircraft.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION

Figure 1:
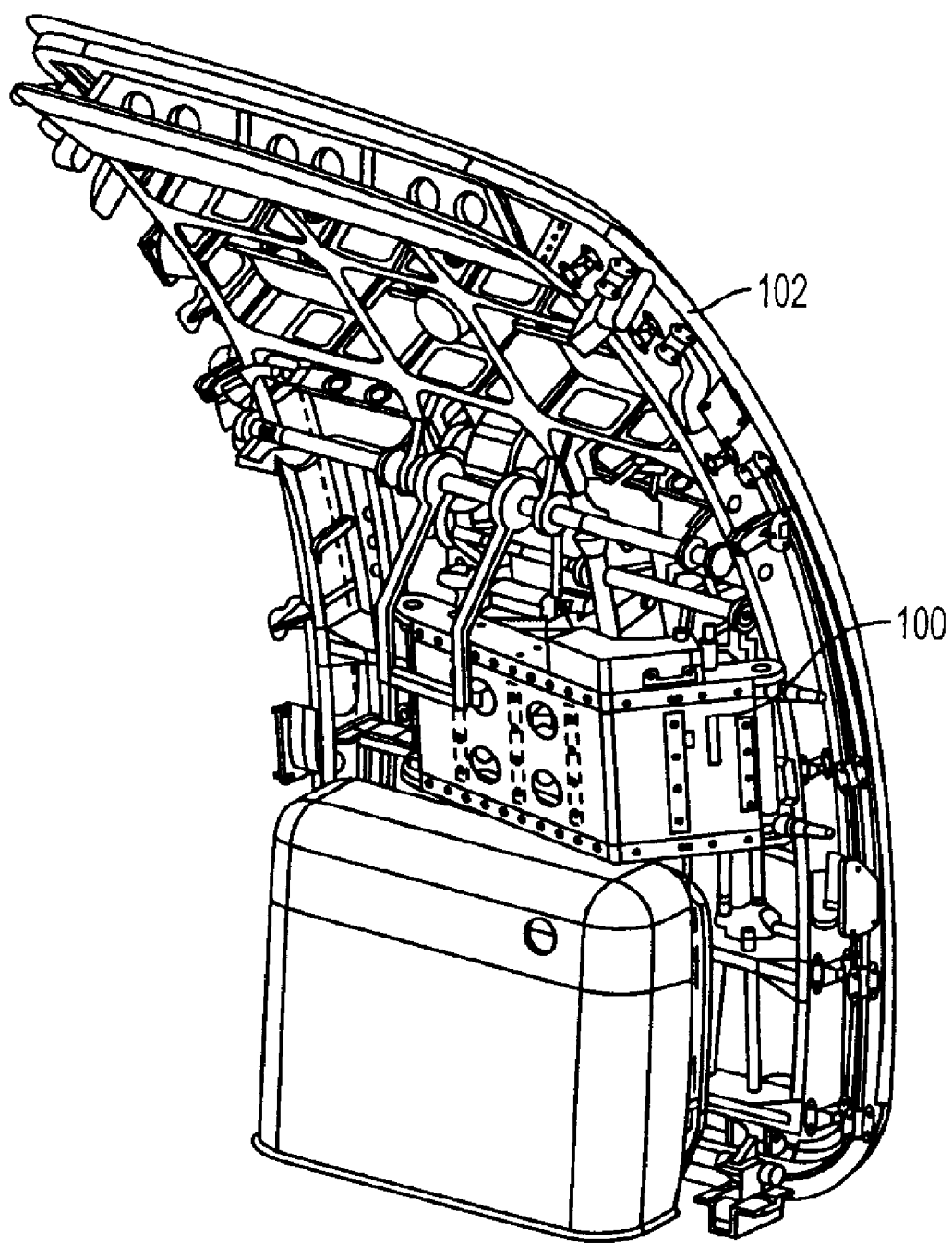
FIG. 1 illustrates an example of an aircraft door viewed from the interior of the aircraft, and which employs a hinge assembly according to an embodiment of the present invention.
Figure 2:
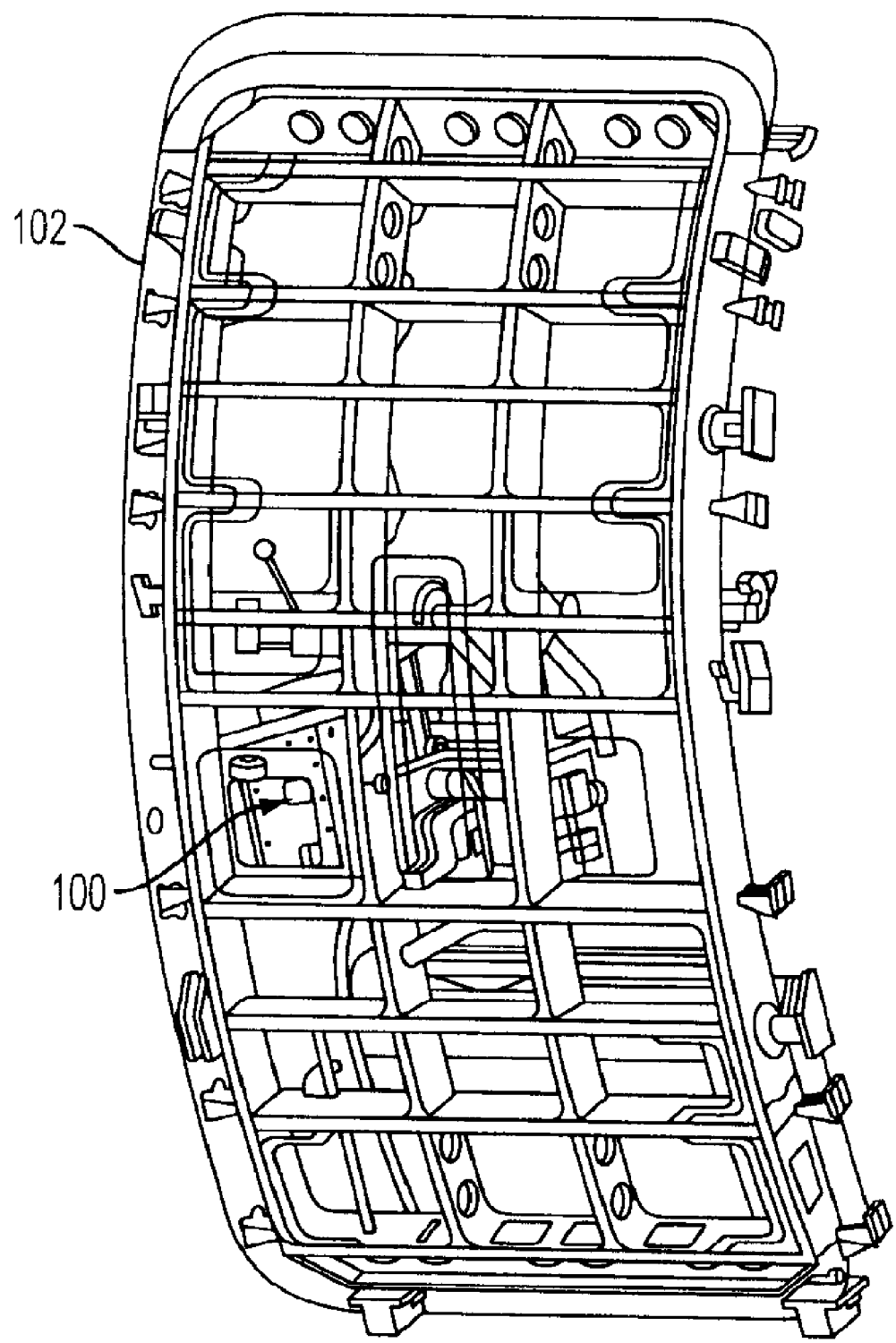
FIG. 2 is a conceptual view illustrating the door shown in FIG. 1 as viewed from the exterior of the aircraft.

An example of a hinge assembly 100 according to the embodiment of the present invention will now be described. As shown in FIGS. 1 and 2, the hinge assembly 100 is coupled to the interior side of an aircraft door 102 and to the fuselage (not shown) of the aircraft as described in more detail below. The hinge assembly 100 enables the aircraft door 102 to be opened such that the aircraft door 102 moves to its final open position parallel or substantially parallel to the fuselage of the aircraft at a specific distance proximate to the outer surface of the fuselage.

As shown in more detail in FIGS. 3-17, the hinge assembly 100 includes a hinge arm assembly 104 comprising a first arm 106 and a second arm 108. The first arm 106 and second arm 108, as well as other components of the hinge arm assembly 104 described herein, can be made of alloy steel or any other suitable material, such as stainless steel, metal and the like sufficient to withstand the load imposed on the hinge assembly 100 by the aircraft door 102 during opening and closing and while the aircraft door 102 is maintained in an open or partially open position. Each of the first and second arms 106 and 108 are angled at a respective angle θ which, in this example is at or about 121°. However, the angle θ can be any suitable angle that will enable the aircraft door 102 to translate in a direction parallel or substantially parallel to the aircraft fuselage when the hinge assembly 100 opens and closes the aircraft door 102.

The hinge assembly 100 further includes an elbow member 110 that is a handle to close the aircraft door 102 and is connected to the second arm 106 by fasteners 112 which can be, for example, nut and bolt connectors or any other suitable connectors such as rivets, screws, or the like. It is noted that all of the fasteners described herein can be nut and bolt connectors or any other suitable connectors such as rivets, screws, or the like, and can be made of any suitable material such as alloy steel, stainless steel and so on. Moreover, all other components of the hinge assembly 100 described herein can be made of any suitable material such as alloy steel, stainless steel, metal and so on.

The first and second arms 106 and 108 are coupled together by panels 114, 116, and 118, as well as long support members 120 and short support members 122. The panels 114, 116, and 118, and the support members 120 and 122 are coupled to the first and second arms 106 and 108 by, for example, fasteners 112 or any other suitable fastening mechanism as can be appreciated by one skilled in the art. Also, different numbers of support members 120 and 122 can be used, and the panels 114, 116, and 118 can each be configured as single or multiple pieces as desired. Also, as illustrated, panel 116 can have an opening therein that can receive a gust lock hook.

The hinge assembly 100 further includes a first pivot shaft 124 that is coupled between first and second arms 106 and 108 as illustrated. The ends of the first pivot shaft 124 can be secured by respective fasteners 126 to the first and second arms 106 and 108. The first and second arms 104 and 106 are therefore able to pivot about first pivot shaft 124 as described in more detail below.

In addition, first pivot shaft 124 pivotally couples shafts 128 to the first and second arms 106 and 108, respectively. As shown in more detail in FIGS. 12 and 16, for example, the shafts 128 are coupled to the portion of the aircraft fuselage that makes up the frame 130 defining the opening that receives the aircraft door 102 when the aircraft door 102 is in the closed position. In this example, a plurality of washers 132 are fitted onto the shafts 128, and the shafts can be secured to the door frame 130 by, for example, bolts, screws, or in any other suitable manner. It is noted that shafts 128 are therefore stationary with respect to the door frame 130, while the first and second arms 106 and 108, and hence, the hinge assembly 100, pivot about first pivot shaft 124 at pivot point P1 along the arcuate direction of arrow A when the aircraft door 102 is moved from the closed position to the open position as discussed in more detail below.

As further illustrated, gears 134 are secured to each shaft 128 by, for example, fasteners 136. Accordingly, gears 134 remain stationary as do shafts 128 when the first pivot shaft 124 rotates with respect to shafts 128 and thus allows the hinge assembly 100 to pivot about the pivot point P1.

As further illustrated, the hinge assembly 100 include gears 138 that are secured in a fixed manner to a second pivot shaft 140 (see FIG. 12) that is rotatably coupled to first and second arms 106 and 108 in a manner similar to first pivot shaft 124 and can rotate as described in more detail below. Specifically, as shown, a plurality of plates 142 having holes therein are secured to the gears 138 and to flanges 144 extending from the shaft 140 by fasteners 146.

As further shown, the hinge assembly 100 includes a third pivot shaft 148 (see FIG. 15) that is rotatably coupled to first and second arms 106 and 108 in a manner similar to first pivot shaft 124. In a manner similar to gears 138, two gears 150 are coupled to the third pivot shaft 148 by plates 152 that are fastened to flanges 154 extending from the third pivot shaft 148. The plates 152 can be secured to the flanges 154 by fasteners 156.

Hinge assembly 100 further comprises a fourth pivot shaft 158 that is rotatably coupled to the first and second arms 104 and 106, respectively. The fourth pivot shaft 158 further pivotably secures a door support assembly 160 to the first and second arms 106 and 108, so that the door support assembly 160 can pivot about pivot point P2. The door support assembly 160 comprises a bracket 161 that has openings for receiving the fourth pivot shaft 158 to thus pivotably couple the bracket 161 to the first and second arms 106 and 108. A plurality of gears 162 are coupled to arms 164 and 166 of the bracket 161 of door support assembly 160 by fasteners 168. The gears 162 each engage with a respective gear 150 as discussed in more detail below. The door support assembly further includes shafts 170 and 172 that are slidably and rotatably coupled to the door support assembly 160 by brackets 174 and 176, respectively. The brackets 174 and 176 can be secured to the door support assembly 160 by fastening members.

The door support assembly 160 further comprises brackets 180, 182, 184 and 186 that are coupled to shafts 170 and 172. In particular, brackets 180 and 182 are coupled to the opposite end of shaft 170 by fastening members 188, and brackets 184 and 186 are coupled to opposite ends of shaft 172 by fastening members 190. The brackets 180-186 each include respective openings 192, 194, 196 and 198 that can receive, for example, bolts to secure the brackets 180-186 to the aircraft door 102.

The hinge assembly 100 further comprises two short rigid linkage members 200 and 202 and two long rigid linkage members 204 and 206. In this example, one end of each rigid linkage member 200 and 202 is pivotably coupled to respective plates 142 by fasteners. The linkage members 200 and 202 each pass through respective openings 208 in one of the long support members 120 and are further coupled to pivot members (e.g. plates) 210 by fasteners 212. The pivot members 210 are further secured by fasteners 212 in a fixed manner to a fifth pivot shaft 214 (see FIGS. 12-16) that is rotatably coupled to first and second arms 106 and 108 in a manner similar to first pivot shaft 124 and can rotate as described in more detail below. Specifically, as shown, the plurality of pivot members 210 having holes therein are secured to flanges 216 extending from the fifth pivot shaft 214 by fasteners 212.

Figure 13:
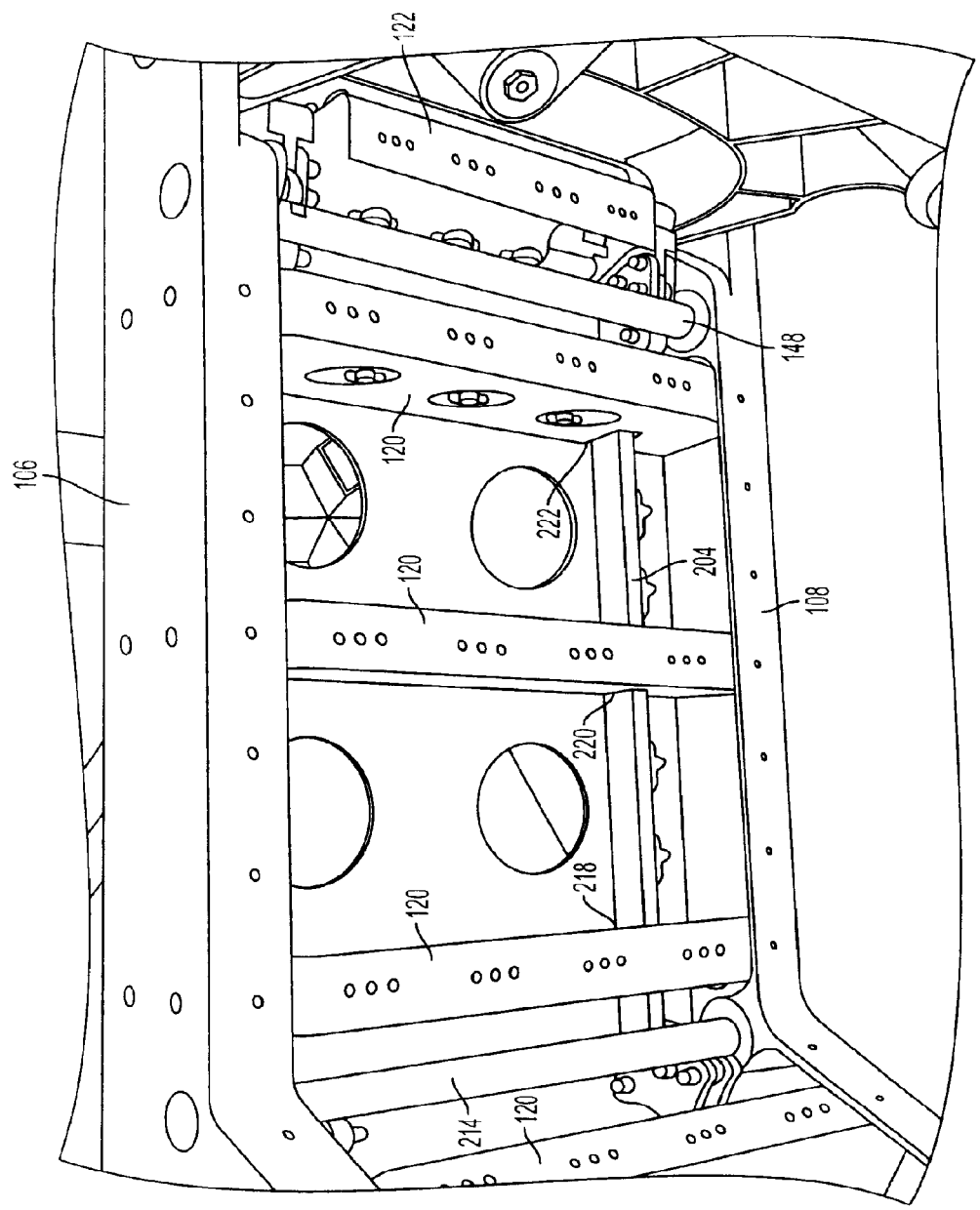
FIG. 13 is a detail view of an example of a portion of the interior of the hinge assembly as shown in FIG. 3.
Figure 14:
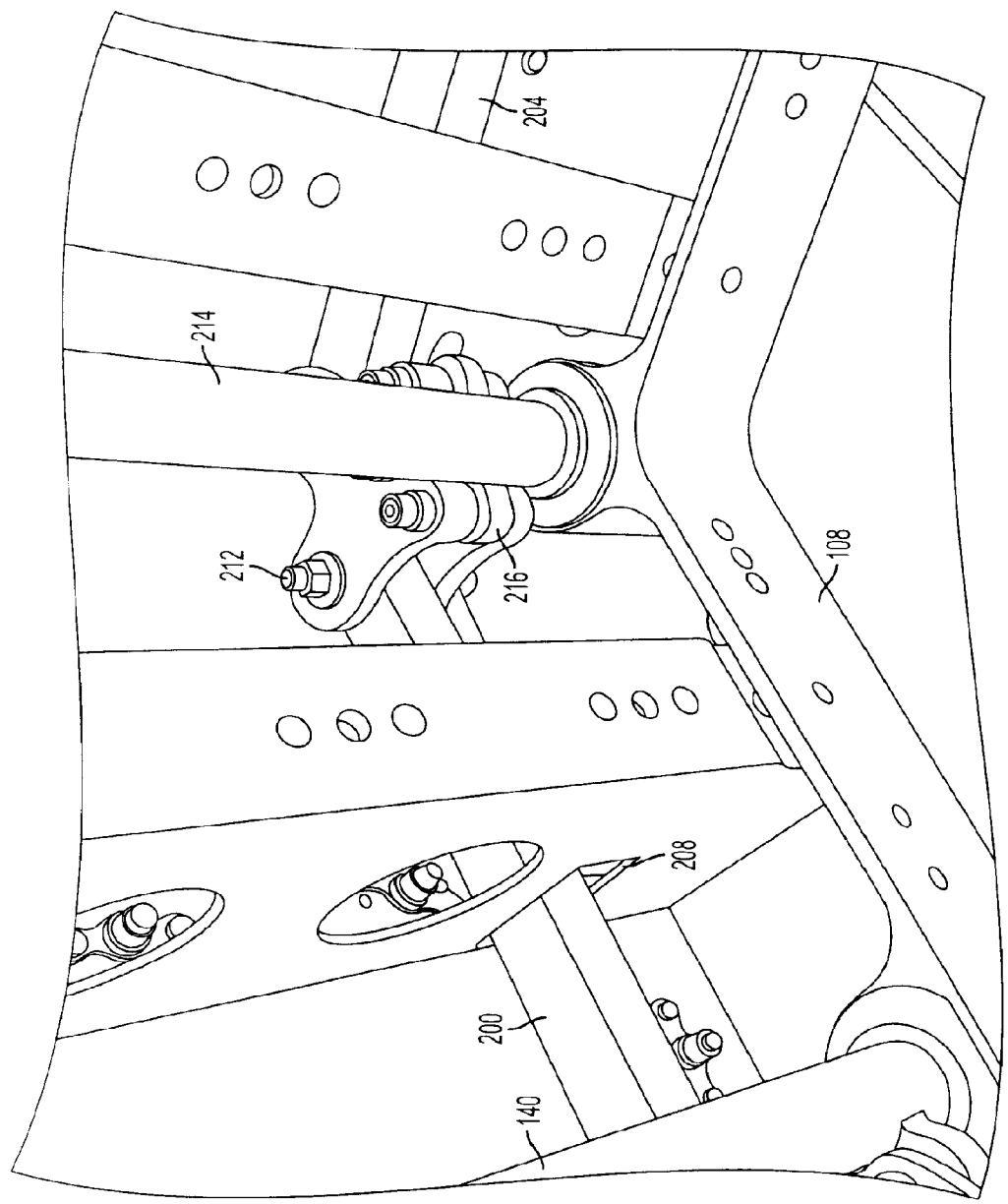
FIG. 14 is a detail view of an example of the linkage mechanism of the hinge assembly as shown in FIG. 3.
Figure 15:
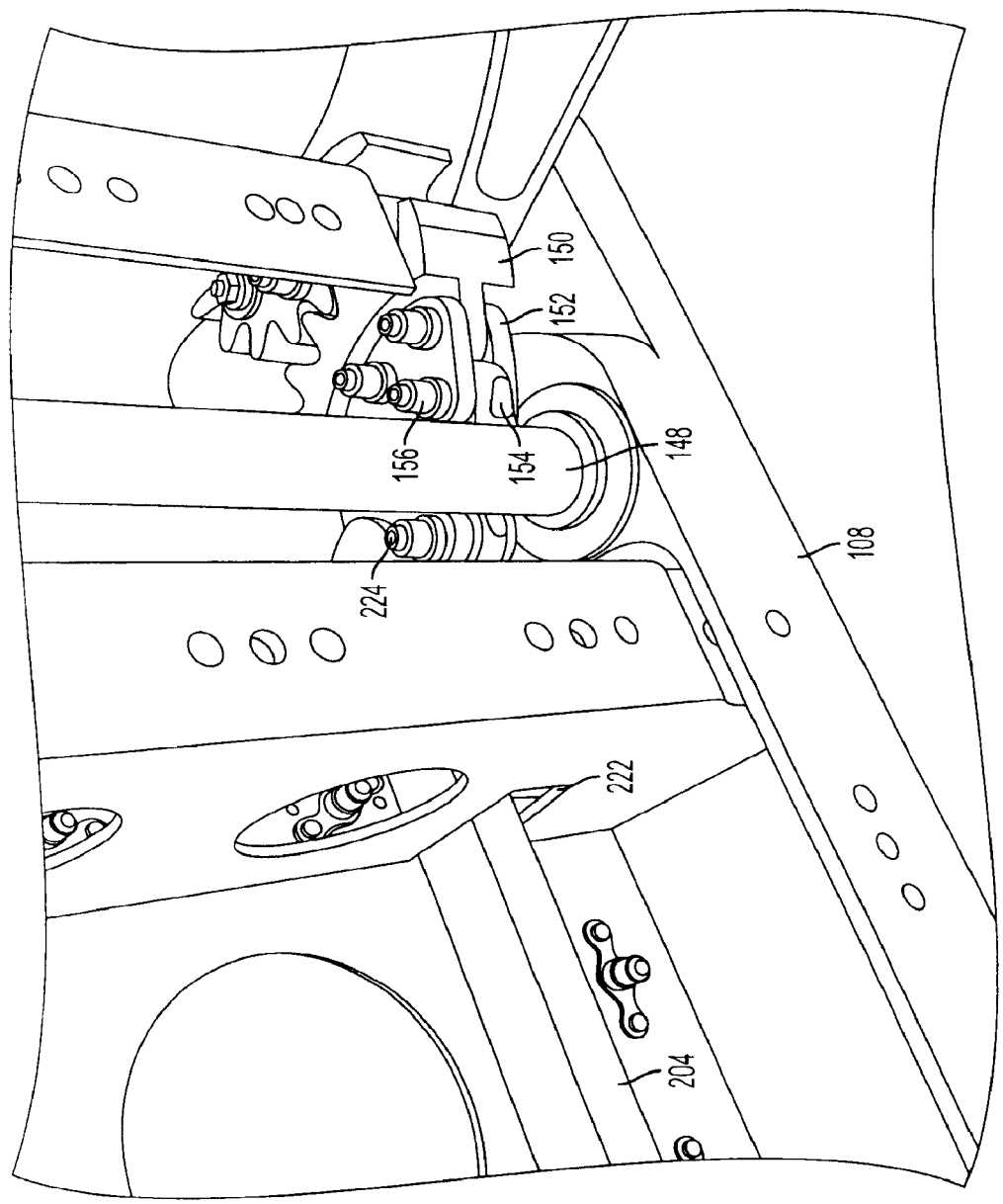
FIG. 15 is a detail view of an example of another group of gear mechanisms of the hinge assembly as shown in FIG. 3.

Long rigid linkage members 204 and 206 are also coupled to respective pivot members 210 by fasteners 212, and each long linkage member 204 and 206 passes through respective openings 218, 220 and 222 in long support members 120 as illustrated, for example, in FIG. 13. The other ends of long linkage members 204 and 206 are coupled to respective plates 152 by fasteners 224.

The operation of the hinge assembly 100 will now be described. When the aircraft door 102 is in the closed position as shown in FIGS. 1 and 2, the hinge assembly 100 is positioned close to the inner surface of the aircraft door 102. When the aircraft door 102 is opened, the hinge assembly 100 rotates in a clockwise direction along arrow A in FIG. 3 about pivot point P1. It is noted that the "clockwise" and "counterclockwise" directions discussed herein are as viewed when looking down from the top of the hinge assembly 100. This motion causes gears 138 to rotate clockwise about gears 134, an also causes movement that is translated through linkage members 200-206 to gears 150. In this example, the smaller diameter gears, such as gears 134 and 162, rotate by 130.3° or about 130.3°, and the larger diameter gears, such as gears 138 and 150, rotate by 69.5° or about 69.5°, between a position at which the aircraft door 102 is fully closed to a position at which the aircraft door 102 is fully open.

Specifically, the movement imposed on short linkage members 200 and 202 by gears 138 causes short linkage members 200 and 202 to rotate fifth pivot shaft 214 in a clockwise direction, which translates movement to long linkage members 204 and 206. This movement of long linkage members 204 and 206 causes pivot shaft 148 and gears 150 to move in a clockwise direction which in turn causes gears 162 to move in a counterclockwise direction. In this event, the door support assembly 160 rotates about pivot point P2 in an arcuate motion along arrow B in FIG. 3.

Figure 16:
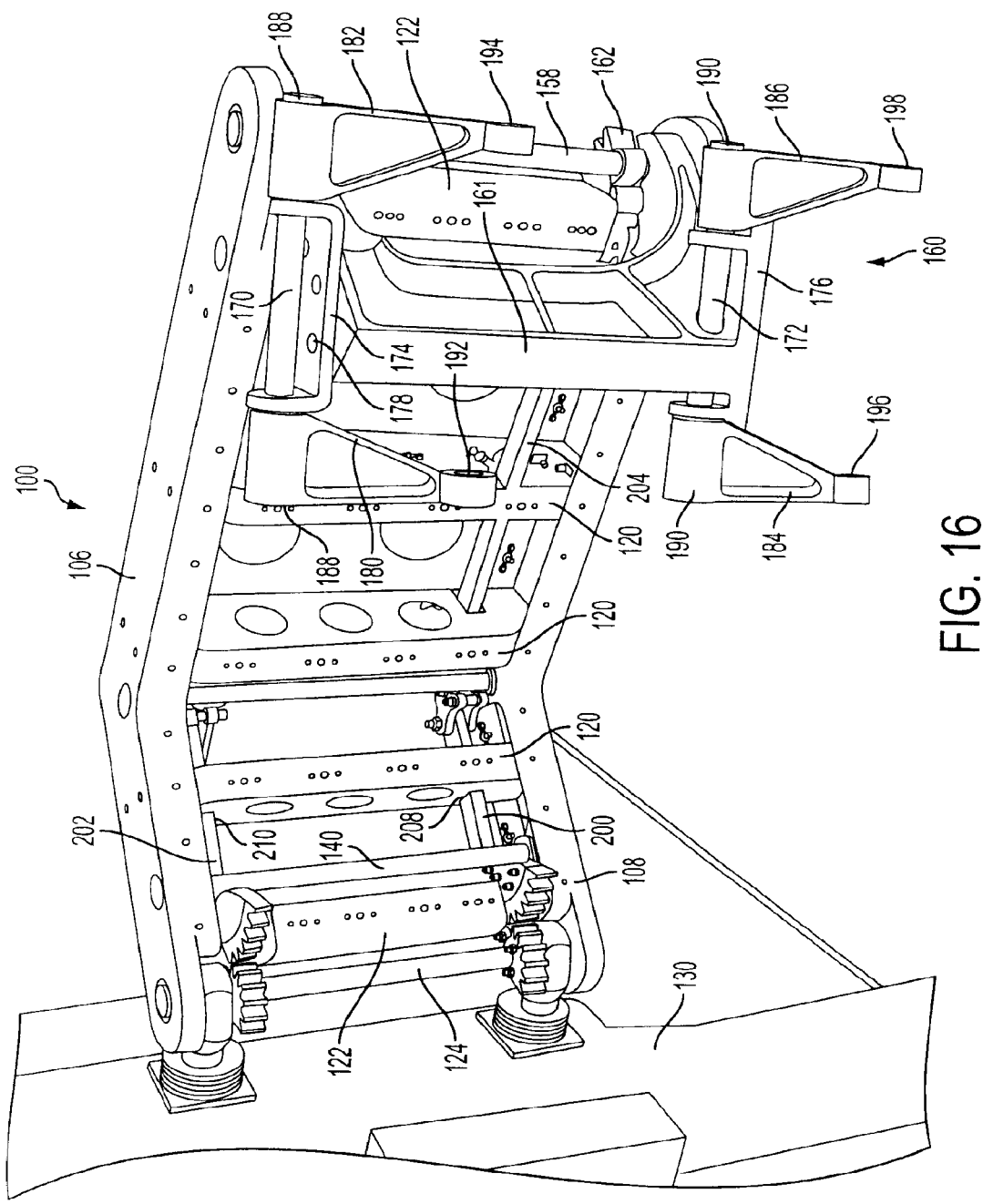
FIG. 16 illustrates an example of a position of the hinge assembly as shown in FIG. 3 when the aircraft door is in the closed position, as viewed inward from the interior of the aircraft door.
Figure 17:
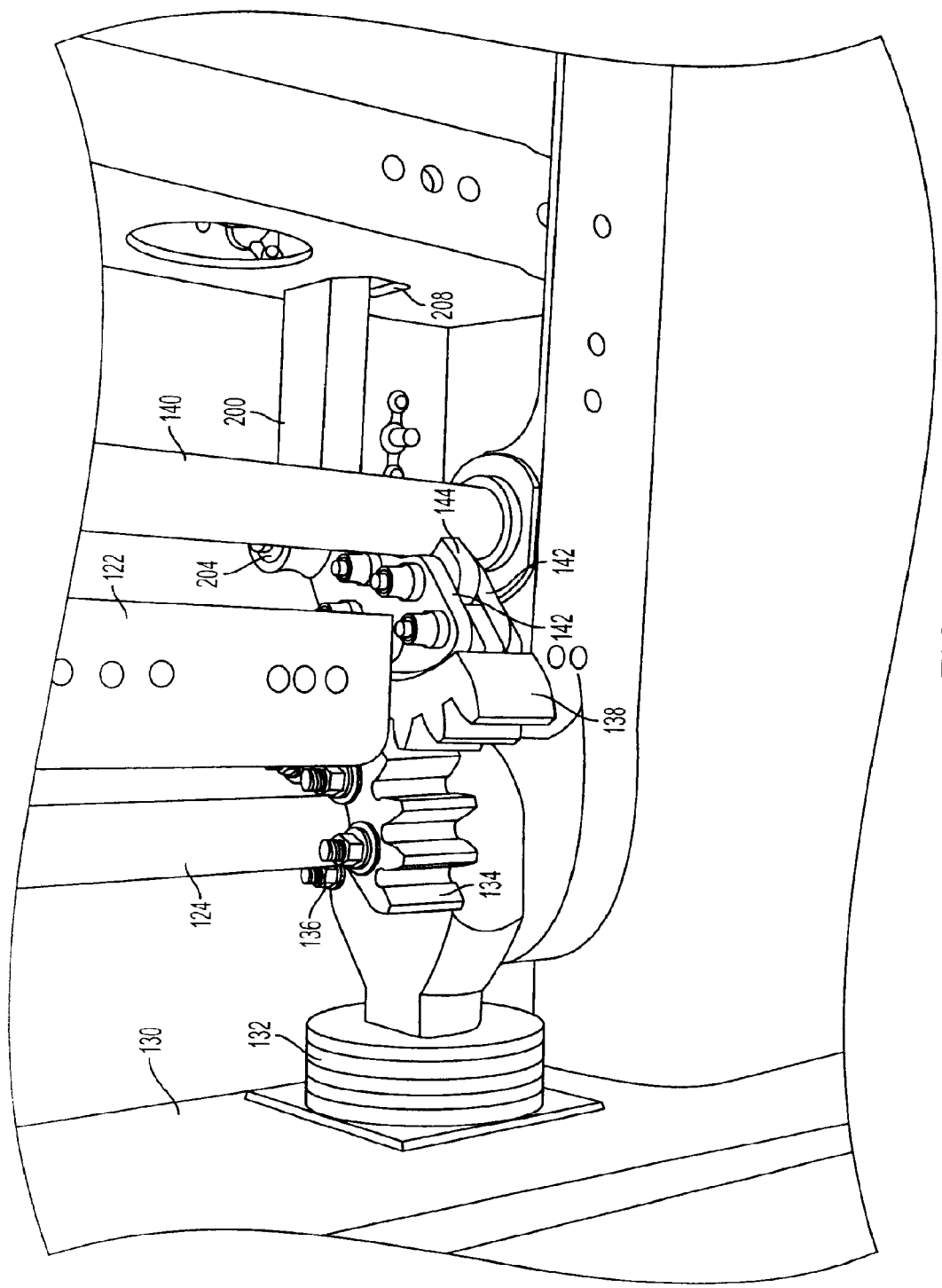
FIG. 17 illustrates an example of rotation of the gears at one end of the hinge assembly when the aircraft door is being moved to an open position.
Figure 18:
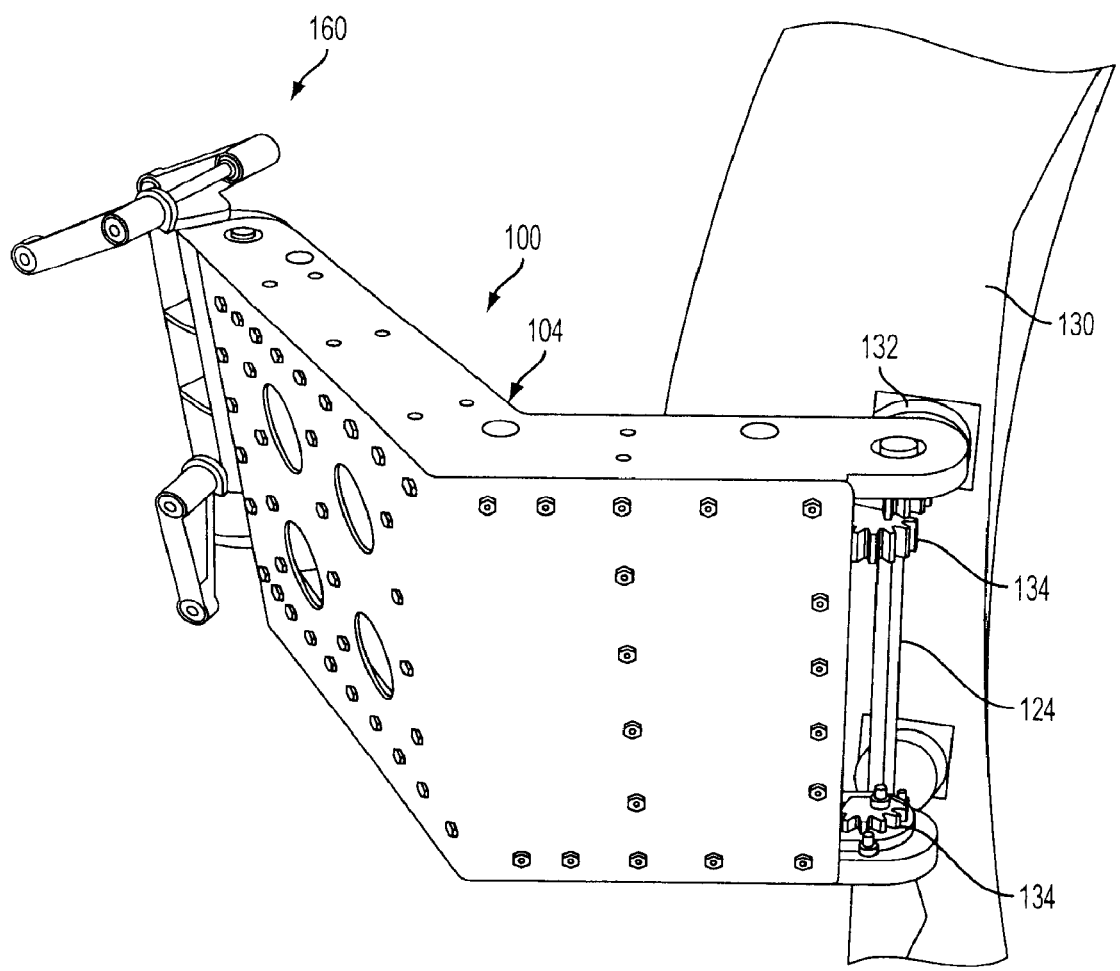
FIG. 18 illustrates an example of the position of the hinge assembly with respect to the aircraft fuselage when the aircraft door is in the fully open position, as viewed in a direction along the fuselage of the aircraft.
Figure 19A:
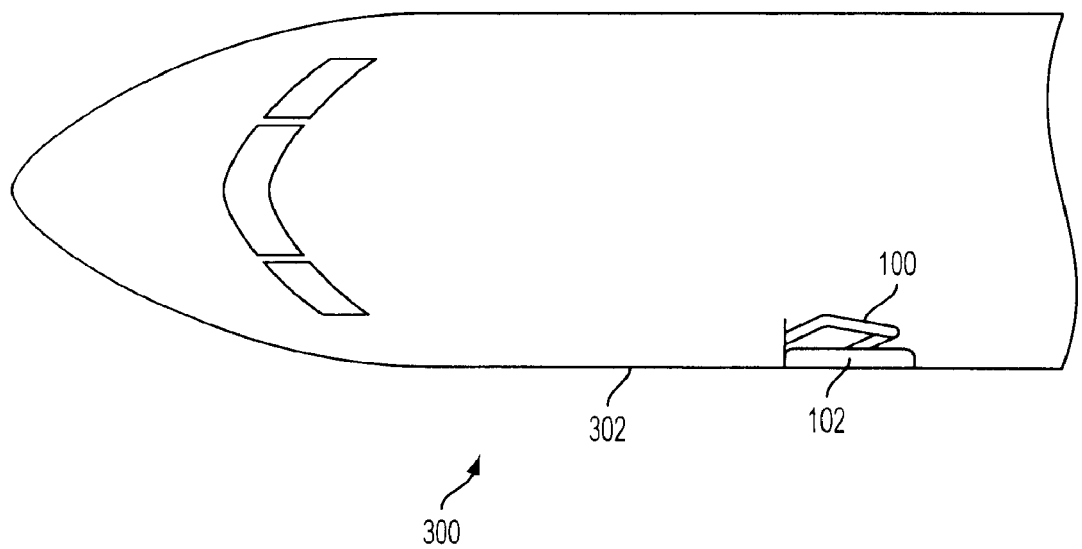
FIGS. 19A, 19B and 19C are top views of an aircraft illustrating an example movement of the aircraft door between the closed and open positions as corresponding to the positions of the hinge assembly as shown in FIGS. 16-18.
Figure 19B:
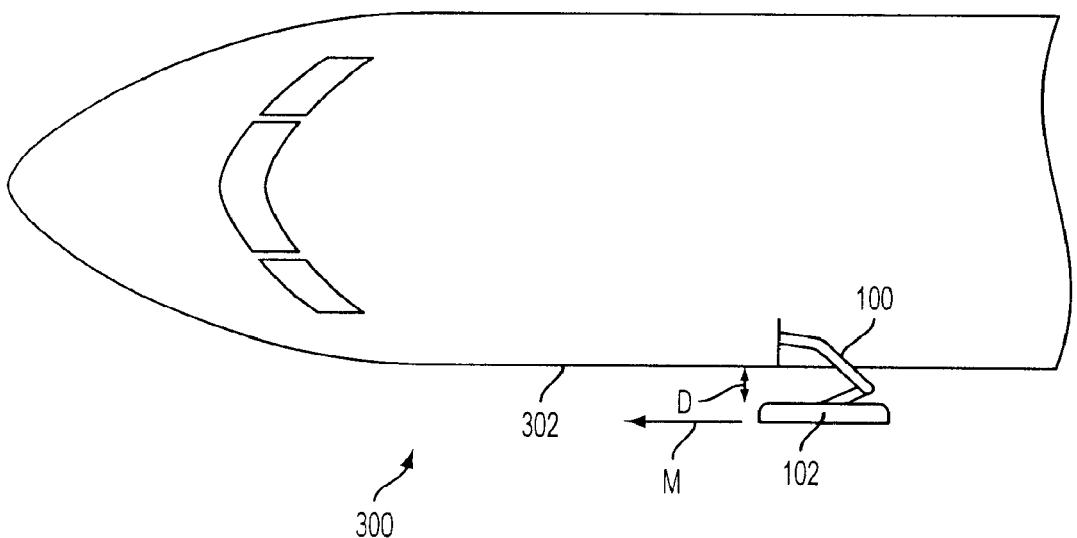
Figure 19C:
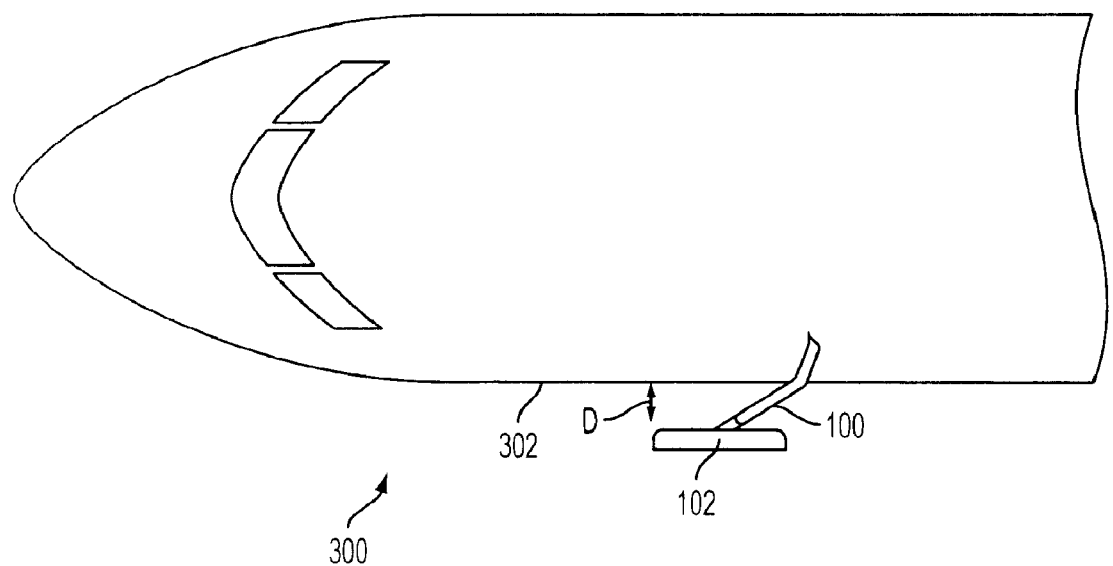

FIGS. 19A, 19B and 19C are top views of an aircraft 300 illustrating an example of movement of the aircraft door 102 between the closed position shown in FIG. 19A, an intermediate position shown in FIG. 19B, and the open position as shown in FIG. 19C, corresponding to the positions of the hinge assembly as shown in FIGS. 16-18. Specifically, the degree of rotation of the gears 138, 150 and 162, and the rotational movement of hinge assembly 100 and door support assembly 160, are synchronized such that when the aircraft door 102 is being opened from the closed position shown in FIG. 19A, the hinge assembly 100 moves the aircraft door 102 to an intermediate position shown in FIG. 19B where the aircraft door 102 is at a certain distance D (e.g., at or about 12 inches) from the outer surface of the aircraft fuselage 302. Then, the aircraft door 102 is continued to be opened and the hinge assembly 100 moves the aircraft door 102 to an open position that is the certain distance D (e.g., at or about 12 inches) from the outer surface of the aircraft fuselage 302, and parallel or substantially parallel to the outer surface of the aircraft fuselage 302. The aircraft door 102 moves generally in the direction of arrow M to its final open position. When the aircraft door 102 is in the final open position as shown in FIG. 19C, the hinge assembly 100 is in an extended position as shown, for example, in FIG. 18.

Figure 3:
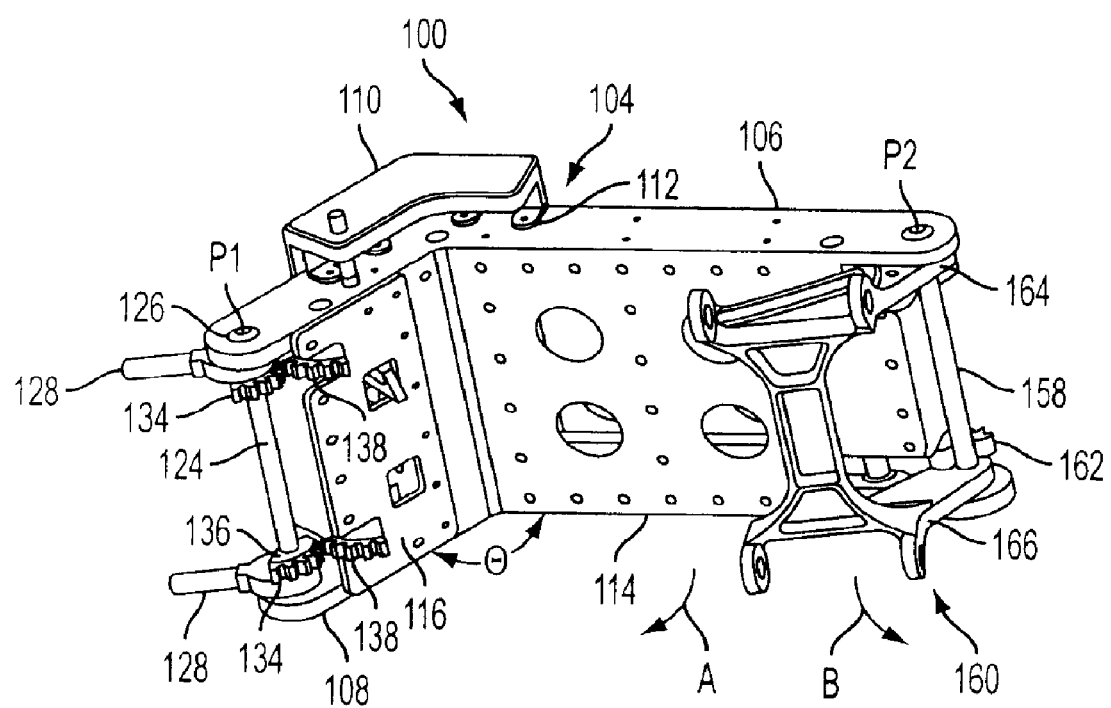
FIG. 3 is a perspective view of an example of a hinge assembly employed in the door shown in FIGS. 1 and 2 according to an embodiment of the present invention, as viewed in a direction away from the interior of the aircraft door.
Figure 4:
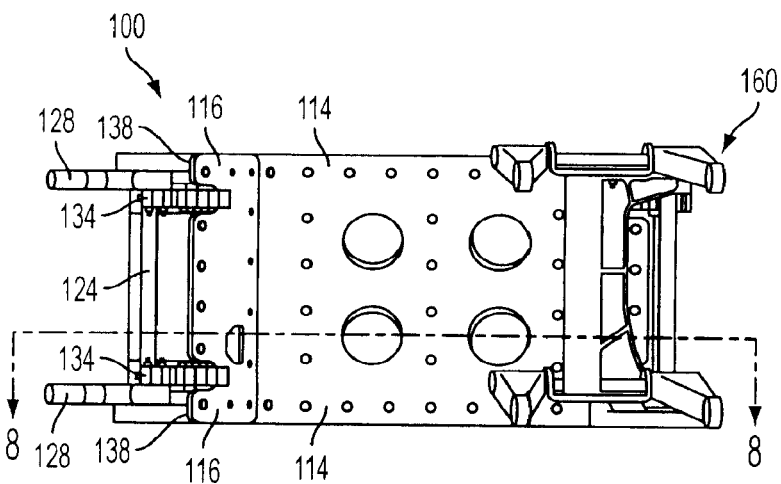
FIG. 4 is a front view of the hinge assembly as shown in FIG. 3, as viewed in a direction away from the interior of the aircraft door.
Figure 5:
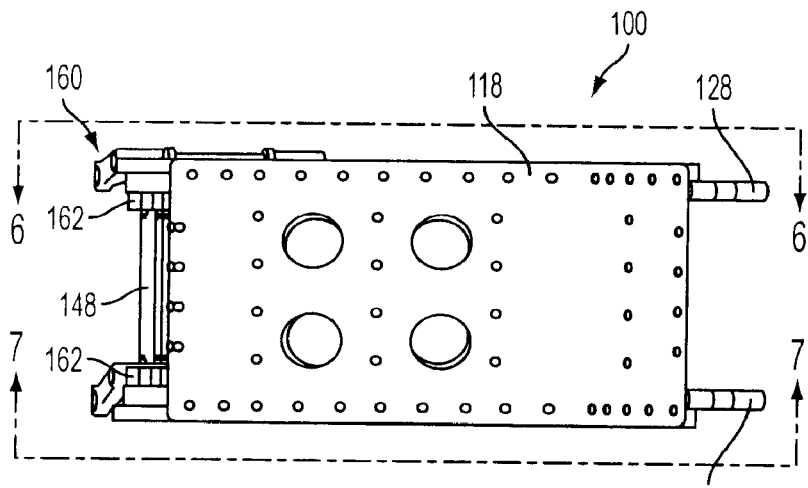
FIG. 5 is a rear view of the hinge assembly as shown in FIG. 3, as viewed in a direction toward the interior of the aircraft door.
Figure 6:
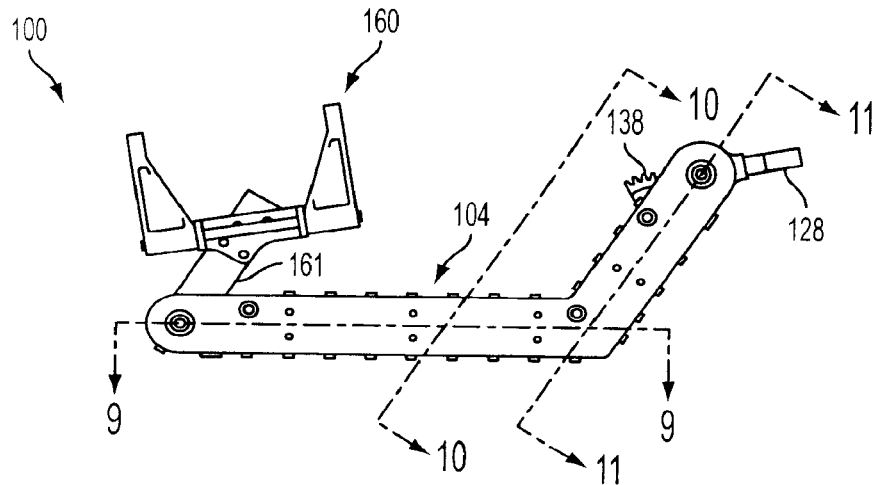
FIG. 6 is a top view of the hinge assembly as taken in the direction of lines 6-6 in FIG. 5.
Figure 7:
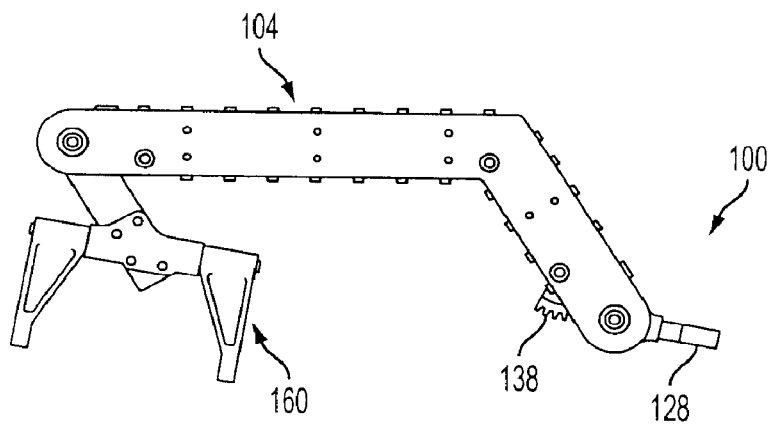
FIG. 7 is a bottom view of the hinge assembly as taken in the direction of lines 7-7 in FIG. 5.
Figure 8:
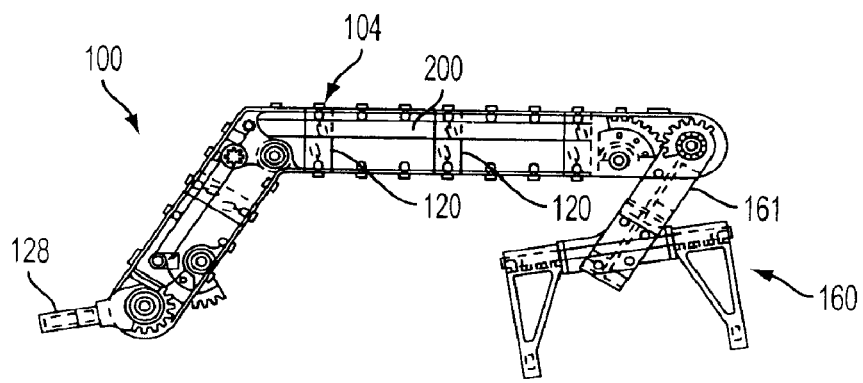
FIG. 8 is sectional view of the hinge assembly as taken along lines 8-8 in FIG. 4, to further illustrate an example components of the hinge assembly.
Figure 9:
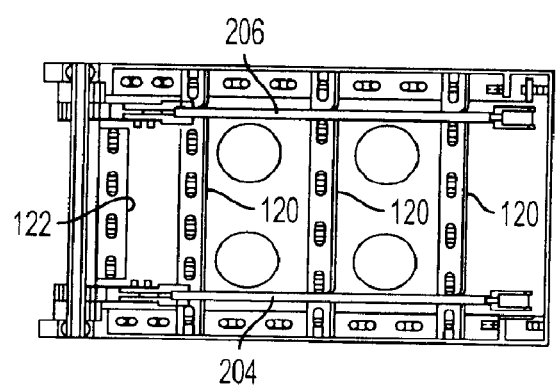
FIG. 9 is a sectional view of a portion of the hinge assembly taken along lines 9-9 in FIG. 6.
Figure 10:
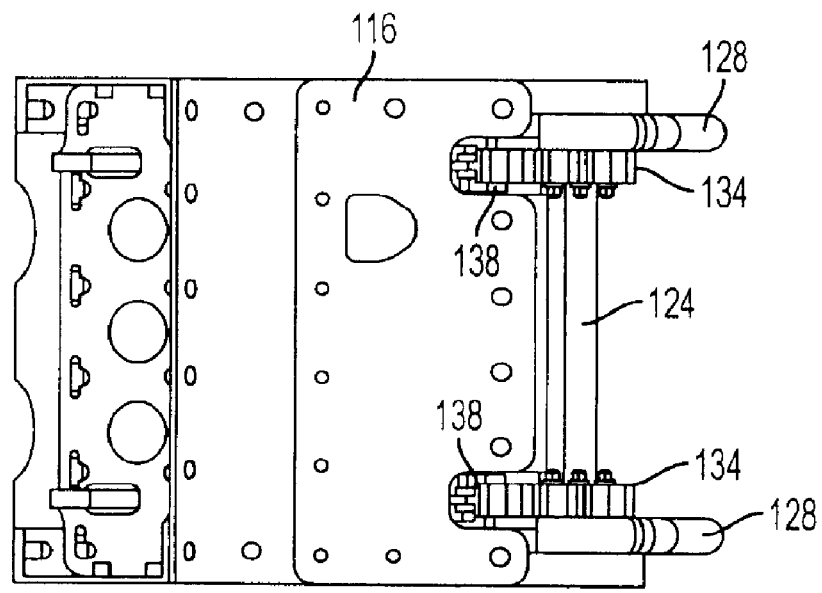
FIG. 10 is a detail view of a portion of the hinge assembly as viewed along lines 10-10 in FIG. 6.
Figure 11:
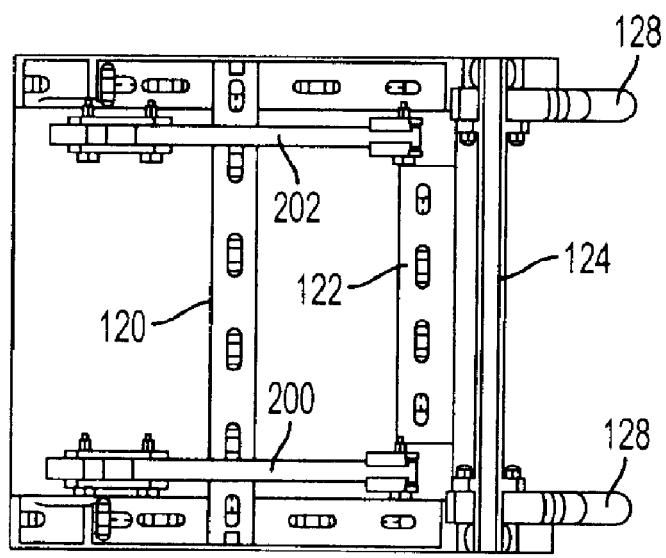
FIG. 11 is a sectional view of a portion of the hinge assembly as taken along lines 11-11 in FIG. 6.
Figure 12:
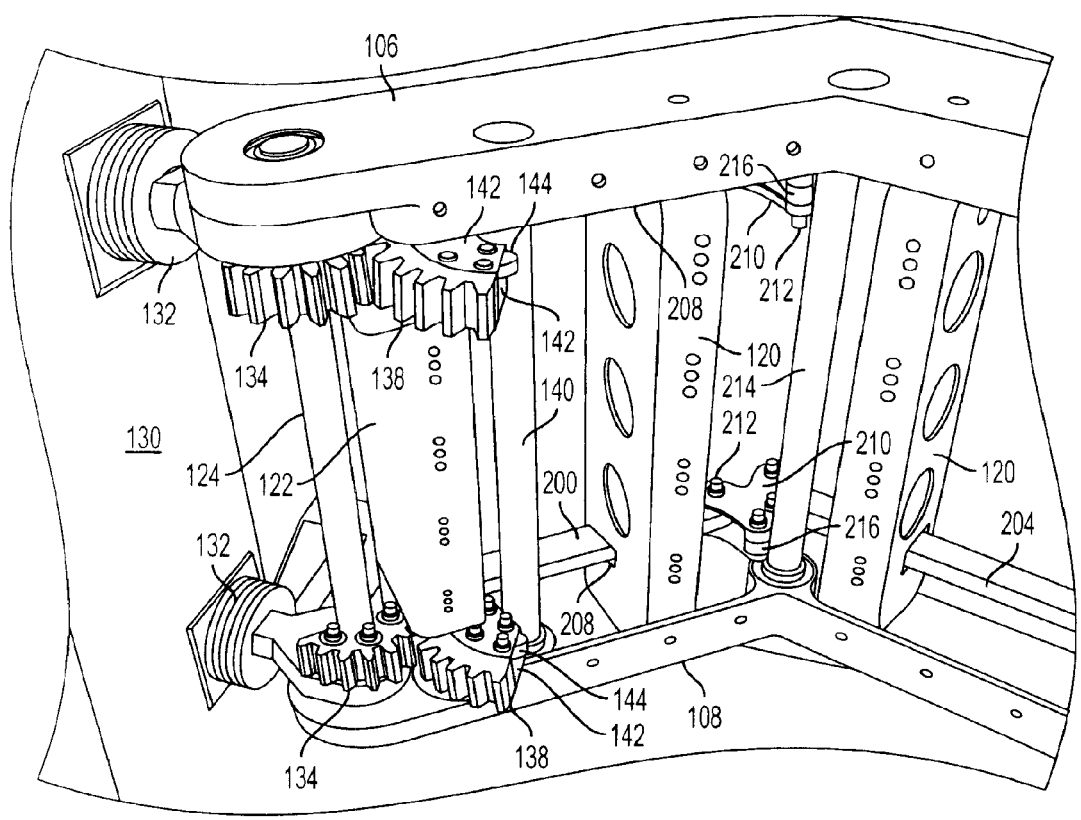
FIG. 12 is a detail view of an example of one group of gear mechanisms of the hinge assembly as shown in FIG. 3.

Similarly, the degree of rotation of the gears 138, 150 and 162, and rotational movement of hinge assembly 100 and door support assembly 160, are synchronized such that when the aircraft door 102 is being closed, the gears 138, 150 and 162 move in respective directions opposite to those during opening, the hinge assembly 100 rotates in a direction opposite to arrow A in FIG. 3, and the door support assembly 160 rotates in a direction opposite to arrow B in FIG. 3. Accordingly, this movement moves the aircraft door 102 along the outer surface of the aircraft fuselage to the intermediate position, as shown in FIG. 19B, at the certain distance D from the outer surface of the aircraft fuselage. Then, as the aircraft door 102 is continued to be closed, the hinge assembly 100 moves the aircraft door 102 into the opening in the door frame 130 to its final closed position. When the aircraft door 102 is in the final closed position as shown in FIG. 19A, the hinge assembly 100 is in a retracted position as shown, for example, in FIGS. 1-3 and 16.

Although only a few exemplary embodiments of the present invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A hinge assembly for use with a door of an entity, the hinge assembly comprising:
   a door support assembly, adapted to couple to the door;
   a hinge arm assembly, comprising a first gear assembly, adapted to couple to the entity, a second gear assembly, adapted to couple the hinge arm assembly to the door support assembly, and a linkage assembly, coupled to the first and second gear assemblies;
   the linkage assembly comprising a pivot member connected between first and second rigid linkage members, wherein the first rigid linkage member is directly connected to and between the first gear assembly and the pivot member, and the second single rigid linkage member is directly connected to and between the pivot member and the second gear assembly; and
   the first and second gear assemblies and linkage assembly being configured to cooperate to move the door support assembly and hinge arm assembly with respect to each other, the first gear assembly comprising first and second interlocking gears, each interlocking gear including teeth on less than half of the circumference of the gear, the first gear stationary with respect to the entity, and the second gear pivotally coupled to the hinge arm assembly and rotatable with respect to the first gear when the hinge assembly moves the door between the open and closed positions.

2. The hinge assembly as claimed in claim 1, wherein:
   the first gear assembly further comprises a first pivot shaft, adapted to pivotally couple the hinge arm assembly to the entity, and a second pivot shaft, adapted to pivotally couple said at least one second gear to the hinge arm assembly.

3. The hinge assembly as claimed in claim 1, wherein:
   the first gear assembly comprises a plurality of said first and second interlocking gears.

4. The hinge assembly as claimed in claim 1, wherein:
   the second gear assembly comprises at least one third gear, pivotally coupled to the hinge arm assembly, and at least one fourth gear, pivotally coupled to the hinge arm assembly and coupled to the door support assembly, said at least one third and fourth gears being adapted to engage and rotate with respect to each other when the hinge assembly moves the door between the open and closed positions.

5. The hinge assembly as claimed in claim 4, wherein:
   the second gear assembly further comprises a third pivot shaft, adapted to pivotally couple said at least one third gear to the hinge arm assembly, and a fourth pivot shaft, adapted to pivotally couple said at least one fourth gear to the hinge arm assembly.

6. The hinge assembly as claimed in claim 5, wherein:
   the fourth pivot shaft further pivotally couples the door support assembly to the hinge arm assembly.

7. The hinge assembly as claimed in claim 4, wherein:
   the second gear assembly comprises a plurality of said third and fourth gears.

8. The hinge assembly as claimed in claim 1, further comprising:
   a fifth pivot shaft, adapted to pivotally couple said first rigid linkage member and said second rigid linkage member to the hinge arm assembly.

9. The hinge assembly as claimed in claim 1, wherein:
   the hinge arm assembly further comprises a first arm portion and a second arm portion, disposed at an angle with respect to each other, with said first rigid linkage member being disposed in the first arm portion and said second rigid linkage member being disposed in the second arm portion.

10. The hinge assembly as claimed in claim 9, wherein:
    the first arm portion is shorter than the second arm portion, and said first rigid linkage member is shorter than said second rigid linkage member.

11. The hinge assembly as claimed in claim 9, wherein the angle is an obtuse angle.

12. The hinge assembly as claimed in claim 1, wherein:
    the entity is a vehicle, and the hinge assembly moves the door from the intermediate position to the open position in a direction of the length of the vehicle.

13. The hinge assembly as claimed in claim 1, wherein:
    the entity is an aircraft, and the hinge assembly moves the door from the intermediate position to the open position in a direction of the length of the fuselage of the aircraft.

14. The hinge assembly as claimed in claim 1, wherein:
    the second gear assembly comprises a plurality of third gears, pivotally coupled to the hinge arm assembly, a plurality of fourth gears, pivotally coupled to the hinge arm assembly and coupled to the door support assembly, with each of the third gears being adapted to engage and rotate with respect to a respective one of the fourth gears when the hinge assembly moves the door between the open and closed positions, a third pivot shaft, adapted to pivotally couple the third gears to the hinge arm assembly, and a fourth pivot shaft, adapted to pivotally couple the fourth gears to the hinge arm assembly.

* * * * *